US010933858B2

(12) United States Patent
Ikushima

(10) Patent No.: US 10,933,858 B2
(45) Date of Patent: Mar. 2, 2021

(54) VEHICLE DRIVE APPARATUS

(71) Applicant: TOYOTA JIDOSHA KABUSHIKI KAISHA, Toyota (JP)

(72) Inventor: Yoshihiro Ikushima, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 146 days.

(21) Appl. No.: 16/284,603

(22) Filed: Feb. 25, 2019

(65) Prior Publication Data

US 2019/0263377 A1 Aug. 29, 2019

(30) Foreign Application Priority Data

Feb. 28, 2018 (JP) .............................. JP2018-035972

(51) Int. Cl.
*B60W 10/08* (2006.01)
*B60L 50/16* (2019.01)

(52) U.S. Cl.
CPC ............. *B60W 10/08* (2013.01); *B60L 50/16* (2019.02); *B60L 2240/12* (2013.01); *B60L 2240/421* (2013.01); *B60L 2240/486* (2013.01)

(58) Field of Classification Search
CPC ....... B60K 17/22; B60K 17/24; B60W 10/10; B60W 10/11
USPC ........................................................ 180/65.7
See application file for complete search history.

(56) References Cited

U.S. PATENT DOCUMENTS

| | | | | |
|---|---|---|---|---|
| 4,793,202 A | * | 12/1988 | Okubo ................. | B60K 17/344 74/339 |
| 5,715,901 A | * | 2/1998 | Tokushima ............... | F16H 1/06 180/65.6 |
| 6,164,149 A | * | 12/2000 | Ohmori .................... | F16H 61/30 477/121 |
| 7,540,211 B2 | * | 6/2009 | Otsubo ................... | F16H 59/68 74/336 R |
| 7,930,086 B2 | * | 4/2011 | Otsubo ............... | F16H 61/0403 701/66 |
| 8,725,371 B2 | * | 5/2014 | Shimizu .............. | F16H 61/2807 701/66 |
| 8,740,745 B2 | * | 6/2014 | Murayama .............. | B60L 50/61 477/8 |
| 9,188,099 B2 | * | 11/2015 | Ikemori ................ | F02N 15/062 |
| 9,266,530 B2 | * | 2/2016 | Ideshio ................. | B60W 10/06 |
| 9,500,238 B2 | * | 11/2016 | Imafuku ................. | F16D 23/04 |
| 9,695,766 B2 | * | 7/2017 | Matsuo ................. | F02D 41/022 |
| 9,829,093 B2 | * | 11/2017 | Nitani ..................... | B60K 17/08 |

(Continued)

FOREIGN PATENT DOCUMENTS

JP H8-294249 A 11/1996
JP 2015-134509 A 7/2015

*Primary Examiner* — Jeffrey J Restifo
(74) *Attorney, Agent, or Firm* — Oliff PLC

(57) ABSTRACT

In a vehicle drive apparatus, a drive gear which engages with a gear provided on the counter shaft is provided on the input shaft relatively rotatably to the input shaft, and the vehicle drive apparatus comprises a switching mechanism including an actuator and a connection/disconnection sleeve which is driven by the actuator in a direction of the first rotation axis and which selectively switches between a first state in which the drive gear is connected to the input shaft and disconnected from a non-rotating member and a second state in which the drive gear is disconnected from the input shaft and connected to the non-rotating member.

7 Claims, 4 Drawing Sheets

(56) References Cited

U.S. PATENT DOCUMENTS

| | | | |
|---|---|---|---|
| 9,849,885 B2* | 12/2017 | Sakamoto | F16D 48/066 |
| 9,982,775 B2* | 5/2018 | Inagaki | F16H 61/66259 |
| 9,994,103 B2* | 6/2018 | Takaira | B60K 17/02 |
| 10,124,669 B2* | 11/2018 | Imafuku | B60K 23/0808 |
| 10,260,575 B2* | 4/2019 | Matsuo | F16D 25/082 |
| 10,293,688 B2* | 5/2019 | Arai | B60K 23/08 |
| 10,525,828 B2* | 1/2020 | Imafuku | B60K 17/344 |
| 10,539,229 B2* | 1/2020 | Inoue | F16H 61/702 |
| 10,569,761 B2* | 2/2020 | Ikushima | B60K 17/02 |

* cited by examiner

VEHICLE DRIVE APPARATUS

This application claims priority from Japanese Patent Application No. 2018-035972 filed on Feb. 28, 2018, the disclosure of which is herein incorporated by reference in its entirety.

FIELD OF THE ART

The present invention relates to a technology in which in a vehicle drive apparatus that selectively locks or unlocks wheels, the number of components of the vehicle drive apparatus is suitably reduced.

BACKGROUND ART

A vehicle drive apparatus is known that includes (a) a rotating electrical machine which serves as a drive power source for a plurality of wheels, (b) an input shaft which is coupled to the rotating electrical machine in a power transmittable manner and rotatably about a first rotation axis, and (c) a counter shaft which is provided rotatably about a second rotation axis parallel to the first rotation axis, and (d) the vehicle drive apparatus transmitting drive power from the rotating electrical machine through the input shaft and the counter shaft to the wheels so as to drive the wheels. An example thereof is a vehicle drive apparatus which is disclosed in Patent Document 1. The vehicle drive apparatus disclosed in Patent Document 1 includes: a drive gear which engages with a gear provided on the counter shaft and which is provided on the input shaft such that the drive gear relatively rotates with respect to the input shaft; and a connection/disconnection sleeve which is driven by an actuator so as to selectively disconnect or connect the drive gear and the input shaft.

PRIOR ART DOCUMENT

Patent Document

Patent Document 1: Japan Patent Publication No. 8-294249

SUMMARY OF THE INVENTION

Technical Problem

In the vehicle drive apparatus as described above, for example, a parking gear is provided on the counter shaft as disclosed on Patent Document 1. Hence, in order to selectively lock or unlock the wheels, a device, such as an actuator dedicated to a parking lock mechanism, which selectively disconnects or connects the parking gear from or to a non-rotating member is needed. However, the provision of the actuator disadvantageously increases the number of components of the vehicle drive apparatus.

The present invention is made in view of the foregoing circumstances, and an object thereof is to provide a vehicle drive apparatus which selectively locks or unlocks wheels and in which the number of constituent components can be suitably reduced.

SOLUTION TO PROBLEM

To achieve the above object, a first aspect of the present invention provides a vehicle drive apparatus (a) including a rotating electrical machine which serves as a drive power source for a plurality of wheels, an input shaft which is coupled to the rotating electrical machine in a power transmittable manner and rotatably about a first rotation axis, and a counter shaft which is provided rotatably about a second rotation axis parallel to the first rotation axis and the vehicle drive apparatus transmitting drive power from the rotating electrical machine through the input shaft and the counter shaft to the wheels so as to drive the wheels, (b) wherein a drive gear which engages with a gear provided on the counter shaft is provided on the input shaft relatively rotatably to the input shaft, and (c) the vehicle drive apparatus comprises a switching mechanism including an actuator and a connection/disconnection sleeve which is driven by the actuator in a direction of the first rotation axis and which selectively switches between a first state in which the drive gear is connected to the input shaft and disconnected from a non-rotating member and a second state in which the drive gear is disconnected from the input shaft and connected to the non-rotating member.

ADVANTAGEOUS EFFECT OF INVENTION

According to the vehicle drive apparatus recited in the first aspect of the invention, (b) the drive gear which engages with the gear provided on the counter shaft is provided on the input shaft relatively rotatably to the input shaft, and (c) the switching mechanism is provided that includes the actuator and the connection/disconnection sleeve which is driven by the actuator in the direction of the first rotation axis and which selectively switches between the first state in which the drive gear is connected to the input shaft and disconnected from the non-rotating member and the second state in which the drive gear is disconnected from the input shaft and connected to the non-rotating member. Hence, the switching mechanism selectively connects the drive gear to one of the non-rotating member and the input shaft with the actuator which drives the connection/disconnection sleeve in the direction of the first rotation axis and the connection/disconnection sleeve which is driven by the actuator in the direction of the first rotation axis so as to selectively disconnect or connect the drive gear and the input shaft. In this way, when a vehicle is not driving, the actuator and the connection/disconnection sleeve connect the drive gear to the non-rotating member so as to lock the wheels. Hence, for example, as compared with a vehicle drive apparatus which includes a device for selectively disconnecting or connecting the drive gear and the input shaft and a device for selectively disconnecting or connecting the drive gear and the non-rotating member individually, the number of components of the vehicle drive apparatus in question can be suitably reduced.

DESCRIPTION OF THE EMBODIMENT

Figure 1:
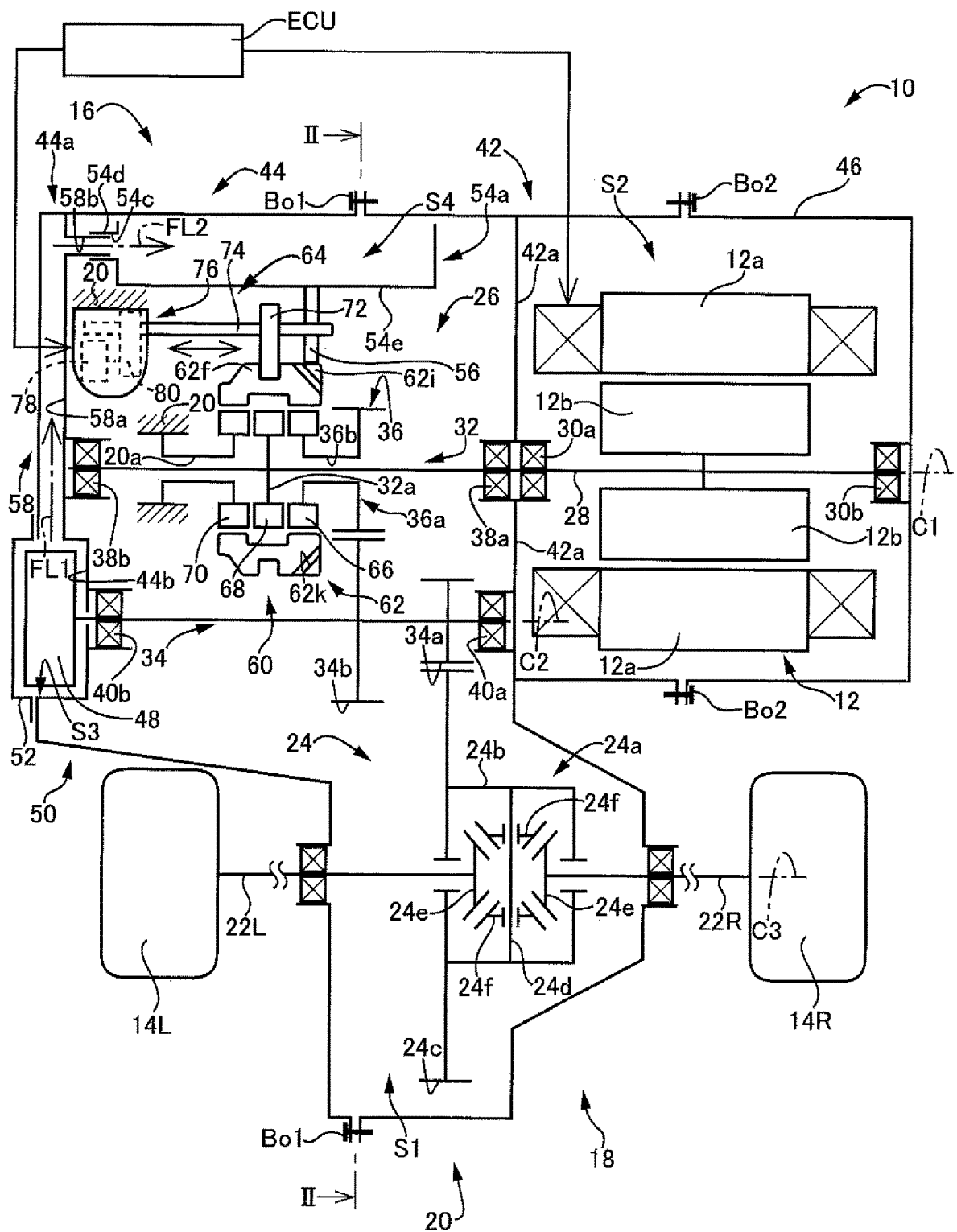
FIG. 1 is a diagram illustrating the configuration of a front wheel drive apparatus of an electric vehicle to which the present invention is suitably applied.

A second aspect of the present invention provides the vehicle drive apparatus recited in the first aspect of the invention, (a) wherein the connection/disconnection sleeve is driven by the actuator to one position of a first position, a second position and a third position selectively, (b) when the connection/disconnection sleeve is in the first position, the drive gear is connected to the input shaft and disconnected from the non-rotating member, (c) when the connection/disconnection sleeve is in the second position, the drive gear is disconnected from the input shaft and connected to the non-rotating member and (d) when the connection/disconnection sleeve is in the third position, the drive gear is disconnected from the input shaft and disconnected from the non-rotating member. Hence, when a normal running mode of the vehicle is performed where the drive power from the rotating electrical machine is transmitted to the wheels for running of the vehicle, the connection/disconnection sleeve is moved by the actuator to the first position, when the wheels are mechanically parking-locked at the time of parking of the vehicle, the connection/disconnection sleeve is moved by the actuator to the second position and when a free-run mode of the vehicle is performed where the rotating electrical machine is disconnected from the wheels so as to perform coasting, the connection/disconnection sleeve is moved by the actuator to the third position.

A third aspect of the present invention provides the vehicle drive apparatus recited in the second aspect of the invention, wherein the first position is set between the second position and the third position in the direction of the first rotation axis. Hence, for example, a switching time in which the normal running mode and the free-run mode are switched and a switching time in which the normal running mode and a parking lock mode of the vehicle are switched are suitably reduced.

A fourth aspect of the present invention provides the vehicle drive apparatus recited in any one of the first to third aspects of the invention, wherein the first rotation axis is arranged coaxially with an output shaft of the rotating electrical machine. Hence, as compared with a vehicle drive apparatus in which the first rotation axis is not arranged coaxially with the output shaft of the rotating electrical machine and in which, for example, the input shaft is coupled to the rotating electrical machine through a gear mechanism so as to transmit the drive power from the rotating electrical machine, it is possible to suitably reduce an agitation loss of an oil caused by a gear in the vehicle drive apparatus in question.

A fifth aspect of the present invention provides the vehicle drive apparatus recited in any one of the first to fourth aspects of the invention, (a) wherein the drive gear is integrally provided with a first hub member including a first outer circumferential engagement tooth, (b) the input shaft is integrally provided with a second hub member including a second outer circumferential engagement tooth, (c) the non-rotating member is integrally provided with a third hub member including a third outer circumferential engagement tooth, (d) the connection/disconnection sleeve engages with at least one of the first outer circumferential engagement tooth, the second outer circumferential engagement tooth and the third outer circumferential engagement tooth and (e) the connection/disconnection sleeve, the first hub member, the second hub member and the third hub member are arranged on the first rotation axis. Hence, even when the first hub member, the second hub member and the third hub member are provided in the vehicle drive apparatus, an increase in the size of the vehicle drive apparatus in a radial direction of the first rotation axis is suitably suppressed.

A sixth aspect of the present invention provides the vehicle drive apparatus recited in the fifth aspect of the invention, (a) wherein the connection/disconnection sleeve includes a first inner circumferential tooth and a second inner circumferential tooth which are separated a predetermined distance apart from each other in the direction of the first rotation axis, (b) the first position is a position in which the second inner circumferential tooth engages both with the first outer circumferential engagement tooth of the first hub member and with the second outer circumferential engagement tooth of the second hub member, (c) the second position is a position in which the first inner circumferential tooth engages with the first outer circumferential engagement tooth of the first hub member and in which the second inner circumferential tooth included in the connection/disconnection sleeve engages with the third outer circumferential engagement tooth of the third hub member and (d) the third position is a position in which the second inner circumferential tooth engages with the first outer circumferential engagement tooth of the first hub member. Hence, when the connection/disconnection sleeve is moved by the actuator to the first position, the drive gear and the input shaft are connected, and the drive gear and the non-rotating member are disconnected, when the connection/disconnection sleeve is moved by the actuator to the second position, the drive gear and the input shaft are disconnected, and the drive gear and the non-rotating member are connected and when the connection/disconnection sleeve is moved by the actuator to the third position, the drive gear and the input shaft are disconnected, and the drive gear and the non-rotating member are disconnected.

A seventh aspect of the present invention provides the vehicle drive apparatus recited in the sixth aspect of the invention, wherein the connection/disconnection sleeve is moved by the actuator from the third position to the first position, after a rotation speed of the second hub member is increased to a rotation speed of the first hub member by the rotating electrical machine through the input shaft. Hence, it is not necessary to provide, in the switching mechanism, a synchronization device for synchronizing the rotation speed of the second hub member with the rotation speed of the first hub member when the connection/disconnection sleeve is moved from the third position to the first position, and the connection/disconnection sleeve can be moved by the actuator from the third position to the first position.

An embodiment of the present invention will be described in detail below with reference to drawings. In the embodiment described below, the drawings are simplified or deformed as necessary, and thus the ratios of the dimensions, the shapes and the like of individual portions are not necessarily accurately drawn.

Embodiment 1

FIG. 1 is a diagram illustrating the configuration of an electric vehicle 10 to which the present invention is suitably applied. The electric vehicle 10 includes a front wheel drive apparatus (vehicle drive apparatus) 16 which drives a pair of left and right front wheels (a plurality of wheels) 14L and 14R by an electric motor (rotating electrical machine) 12 that is a drive power source for running. As shown in FIG. 1, the front wheel drive apparatus 16 includes; the electric motor 12; a power transmission mechanism 18 which transmits drive power from the electric motor 12 to the pair of left and right front wheels 14L and 14R; a storage casing 20 which stores the electric motor 12, the power transmission mechanism 18 and the like; and drive shafts 22L and 22R which are rotated together with the pair of left and right front wheels 14L and 14R. In the power transmission mechanism 18, a differential device 24 which is coupled to the pair of left and right front wheels 14L and 14R such that the drive power can be transmitted thereto through the drive shafts 22L and 22R and a reduction gear mechanism 26 which is provided in a power transmission path between the differential device 24 and the electric motor 12 are provided. The electric motor 12 also serves as a drive power source for the pair of left and right front wheels 14L and 14R.

As shown in FIG. 1, for example, the electric motor 12 includes: a cylindrical stator 12a which is fixed to the storage casing 20; and a cylindrical rotor 12b which is fixed to a rotor shaft (output shaft) 28 inside the cylindrical stator 12a with a predetermined distance apart. The rotor shaft 28 which penetrates and is integrally fixed to the cylindrical rotor 12b is supported through a pair of first bearings 30a and 30b on the storage casing 20 such that the rotor shaft 28 can be rotated about a first rotation axis C1.

As shown in FIG. 1, the differential device 24 includes: a differential casing 24a which is supported so as to rotate about a third rotation axis C3 and which is formed in the shape of a container; a differential ring gear 24c which is fixed to an outer circumferential portion 24b of the differential casing 24a; a cylindrical pinion shaft 24d whose both end portions are supported by the differential casing 24a and which is fixed with an unillustrated knock pin to the differential casing 24a in a posture perpendicular to the third rotation axis C3 of the differential casing 24a; a pair of side gears 24e which are arranged opposite each other through the pinion shaft 24d so as to rotate about the third rotation axis C3 and which are stored within the differential casing 24a; and a pair of pinions 24f which are rotated together with the differential casing 24a in a state where the pinions 24f are rotatably supported by the pinion shaft 24d which is inserted through the pair of pinions 24f and the pair of pinions 24f engage with the pair of side gears 24e. When the drive power from the electric motor 12 is input through the reduction gear mechanism 26 to the differential ring gear 24c, the differential device 24 configured as described above distributes the input torque from the electric motor 12 to the pair of left and right front wheels 14L and 14R while allowing a differential rotation of the pair of side gears 24e which are rotated together with the pair of left and right drive shafts 22L and 22R.

As shown in FIG. 1, the reduction gear mechanism 26 includes: an input shaft 32 which is connected to the rotor shaft 28 provided in the electric motor 12 such that the rotor shaft 28 transmits the drive power to the input shaft 32 and to which the drive power from the electric motor 12 is input; a small diameter gear 34a which engages with the differential ring gear 24c provided in the differential device 24; a large diameter gear (gear) 34b which has a diameter larger than the small diameter gear 34a and which engages with a drive gear 36 that will be described later; and a counter shaft 34 to which the small diameter gear 34a and the large diameter gear 34b are integrally fixed. In the reduction gear mechanism 26, the input shaft 32 is supported by the storage casing 20 through a pair of second bearings 38a and 38b provided at both end portions of the input shaft 32 such that the input shaft 32 rotates about the first rotation axis C1, that is, such that the input shaft 32 rotates about the rotation axis C1 the same as with the rotor shaft 28 provided in the electric motor 12. In other words, the first rotation axis C1 is arranged coaxially with the rotor shaft 28 provided in the electric motor 12. The rotor shaft 28 functions as an output shaft which outputs the drive power from the electric motor 12 to the input shaft 32. The counter shaft 34 is supported by the storage casing 20 through a pair of third bearings 40a and 40b provided at both end portions of the counter shaft 34 such that the counter shaft 34 rotates about a second rotation axis C2. The drive gear 36 engages with the large diameter gear 34b which is integrally provided on the counter shaft 34 and is supported by the input shaft 32 such that the drive gear 36 relatively rotates with respect to the input shaft 32. The first rotation axis C1, the second rotation axis C2 and the third rotation axis C3 are arranged parallel to each other.

As shown in FIG. 1, the storage casing 20 includes: a first casing member 42; a second casing member 44 which is integrally fixed with a first fastening bolt Bo1 to the first casing member 42; and a third casing member 46 which is integrally fixed with a second fastening bolt Bo2 to the first casing member 42. In the storage casing 20, a first storage space S1 which is defined with the first casing member 42 and the second casing member 44 and a second storage space S2 which is defined with the first casing member 42 and the third casing member 46 are formed, in the first storage space S1, the power transmission mechanism 18, such as the reduction gear mechanism 26 and the differential device 24, and the like are stored and in the second storage space S2, the electric motor 12 and the like are stored. In the first casing member 42, a partition wall 42a is formed which partitions the first storage space S1 and the second storage space S2, and in the second casing member 44, a wall portion 44a which is opposite to the partition wall 42a formed in the first casing member 42 is formed.

As shown in FIG. 1, in the front wheel drive apparatus 16, a lubrication path 50 is provided which supplies with, for example, a mechanical oil pump 48 an oil OIL (see FIG. 2) that is stored in the storage casing 20 to the power transmission mechanism 18 so as to lubricate the power transmission mechanism 18 and the like.

The mechanical oil pump 48 is, for example, an internal gear type oil pump. As shown in FIG. 1, the mechanical oil pump 48 includes: a pump chamber S3 which is defined with the wall portion 44a of the second casing member 44 and a pump cover 52 attached to the wall portion 44a of the second casing member 44; an annular inner rotor (unillustrated) which includes a plurality of outer teeth, which is coupled to the counter shaft 34 so as to be able to transmit power thereto and which is supported so as to be able to be rotated about the second rotation axis C2; and an annular outer rotor (unillustrated) which includes a plurality of inner teeth that engage with the outer teeth of the inner rotor and which is supported so as to be able to be rotated about a rotation axis which is made eccentric from the second rotation axis C2 by a concave portion 44b formed in the wall portion 44a of the second casing member 44.

As shown in FIG. 1, the lubrication path 50 includes: a catch tank 54 which stores the oil OIL; a lubricating pipe 56 (see FIGS. 2 and 3) which discharges the oil OIL stored in the catch tank 54 from a discharge port 56a; and a supply oil path 58 which supplies the oil OIL, which is discharged from the mechanical oil pump 48, to the catch tank 54.

As shown in FIG. 1, the supply oil path 58 includes: a discharge oil path 58a which is formed in the wall portion 44a of the second casing member 44 along the wall portion 44a and which is connected to an unillustrated discharge port in the mechanical oil pump 48; and a branch oil path 58b which is branched from the discharge oil path 58a and which supplies the oil OIL, which is discharged from the mechanical oil pump 48, to the catch tank 54. Arrows FL1 and FL2 shown in FIG. 1 indicate the flow of the oil OIL which is discharged from the mechanical oil pump 48.

Figure 2:
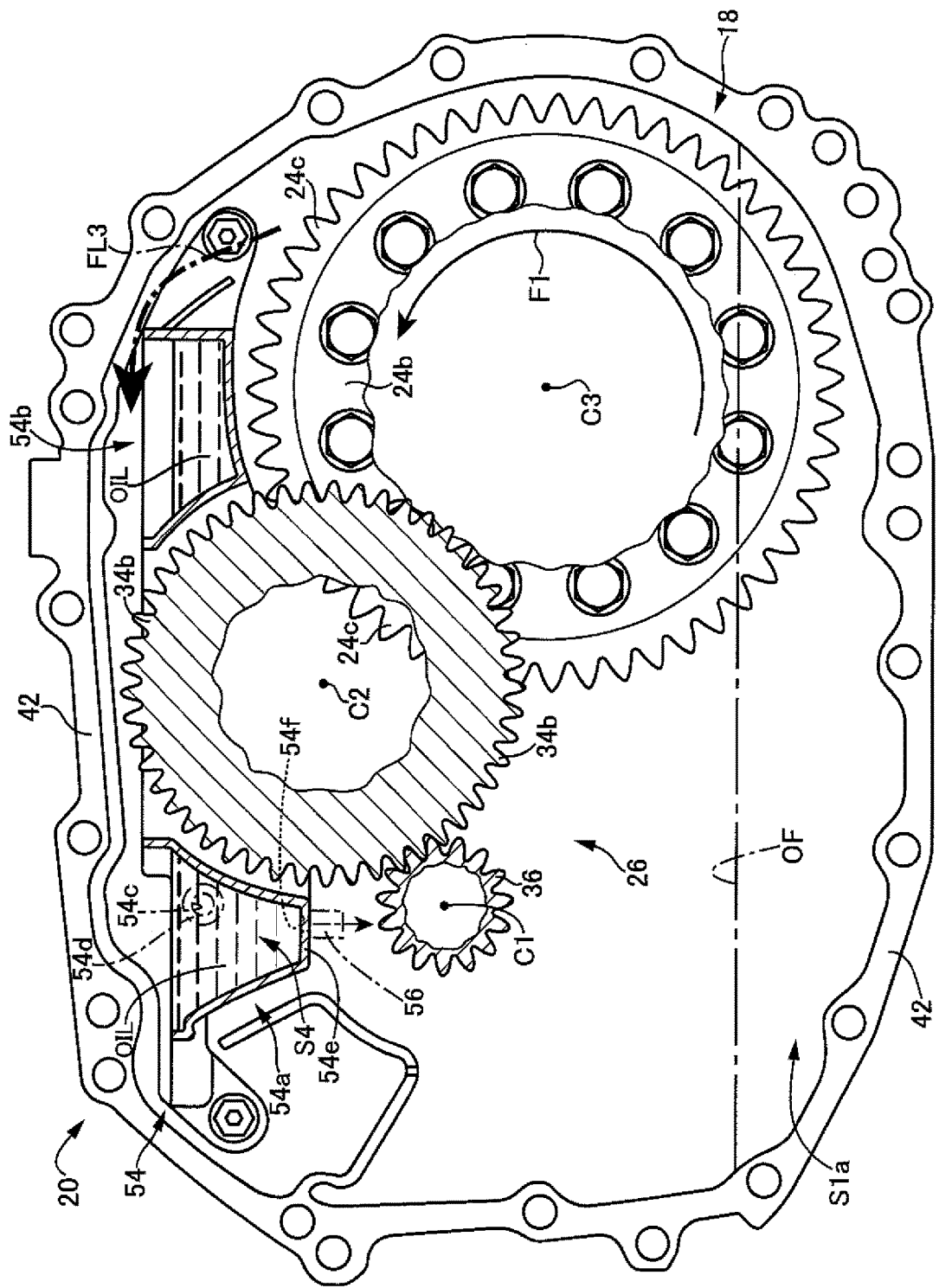
FIG. 2 is a cross-sectional view taken along line II-II in FIG. 1 and a diagram illustrating the configuration of a catch tank which is provided in the front wheel drive apparatus of FIG. 1.

As shown in FIG. 2, the catch tank 54 includes: a first storage portion 54a which stores the oil OIL discharged from the mechanical oil pump 48; a second storage portion 54b which stores the oil OIL that is lifted (splashed up) by a rotation of the differential ring gear 24c of the differential device 24 about the third rotation axis C3 in a direction of an arrow F1 when the vehicle runs forward; and a distribution portion (unillustrated) which distributes the oil OIL stored in the first storage portion 54a and the oil OIL stored in the second storage portion 54b respectively. In FIG. 2, an oil surface OF which is represented by an alternate long and short dashed line is a line which represents an oil surface of the oil OIL stored in a storage space S1a of the storage casing 20, for example, when the vehicle runs forward. An arrow FL3 shown in FIG. 2 indicates the flow of the oil OIL which is lifted by the rotation of the differential ring gear 24c in the direction of the arrow F1.

As shown in FIGS. 1 and 2, a cylindrical portion 54d which is formed in the shape of a cylinder is provided so as to be fixed to the first storage portion 54a of the catch tank 54, and in the cylindrical portion 54d, a communication hole 54c is formed which makes the branch oil path 58b formed in the wall portion 44a of the second casing member 44 and a storage space S4 in the first storage portion 54a of the catch tank 54 communicate with each other. In a bottom portion 54e of the first storage portion 54a of the catch tank 54, a release hole 54f (see FIG. 2) is formed through which the oil OIL stored in the first storage portion 54a is released, and the lubricating pipe 56 is connected to the release hole 54f. Within the storage casing 20, the first storage portion 54a of the catch tank 54 is arranged higher than the lubricating pipe 56 in a vertical direction, that is, is arranged higher than the discharge port 56a of the lubricating pipe 56 in the vertical direction, and the oil OIL stored in the first storage portion 54a of the catch tank 54 is discharged from the discharge port 56a of the lubricating pipe 56, for example, by the weight of the oil OIL itself.

As shown in FIG. 1, the power transmission mechanism 18 includes a switching mechanism 60 which selectively switches between: the connection of the drive gear 36 to the input shaft 32 and the disconnection of the drive gear 36 from a non-rotating member such as the storage casing 20 which is provided in the vehicle drive apparatus 16; the disconnection of the drive gear 36 from the input shaft 32 and the connection of the drive gear 36 to the storage casing 20; and the disconnection of the drive gear 36 from the input shaft 32 and the disconnection of the drive gear 36 from the storage casing 20. The "connection of the drive gear 36 to the input shaft 32 and the disconnection of the drive gear 36 from a non-rotating member such as the storage casing 20 which is provided in the vehicle drive apparatus 16" described above means that the drive gear 36 and the input shaft 32 are connected and the drive gear 36 and the storage casing 20 are disconnected. The "disconnection of the drive gear 36 from the input shaft 32 and the connection of the drive gear 36 to the storage casing 20 which is the non-rotating member" described above means that the drive gear 36 and the input shaft 32 are disconnected and the drive gear 36 and the storage casing 20 are connected. The "disconnection of the drive gear 36 from the input shaft 32 and the disconnection of the drive gear 36 from the storage casing 20 which is the non-rotating member" means that the drive gear 36 and the input shaft 32 are disconnected and the drive gear 36 and the storage casing 20 are disconnected.

As shown in FIG. 1, the switching mechanism 60 includes an actuator 64 and a ring-shaped connection/disconnection sleeve 62 which is driven by the actuator 64 in a direction of the first rotation axis C1 and which selectively switches between: the connection of the drive gear 36 to the input shaft 32 and the disconnection of the drive gear 36 from the storage casing 20; the disconnection of the drive gear 36 from the input shaft 32 and the connection of the drive gear 36 to the storage casing 20; and the disconnection of the drive gear 36 from the input shaft 32 and the disconnection of the drive gear 36 from the storage casing 20.

Figure 4:
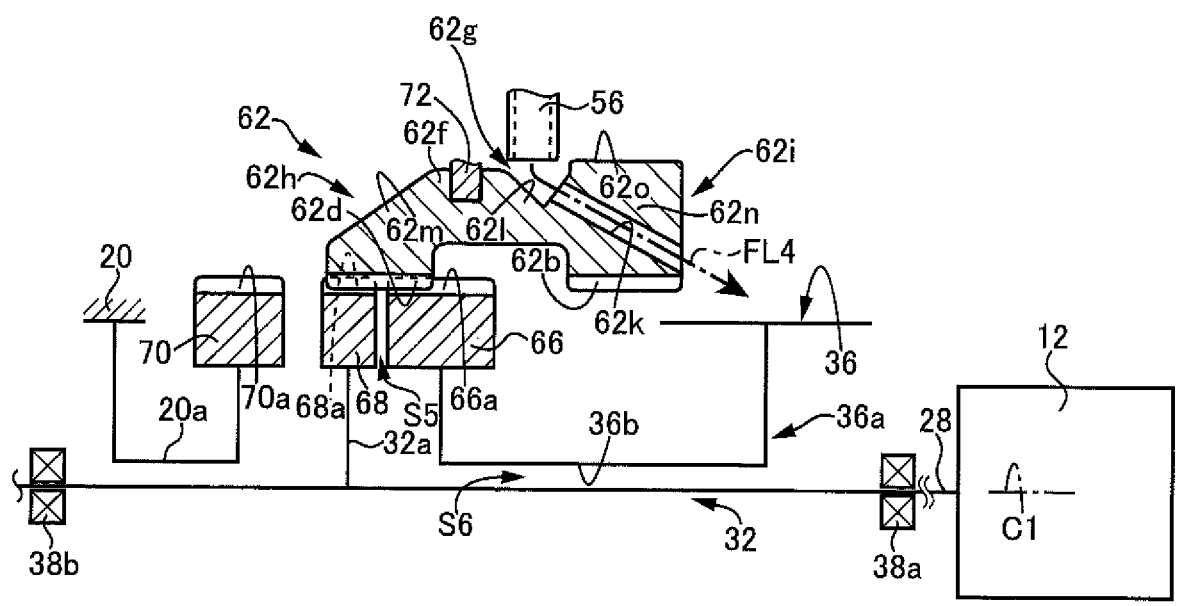
FIG. 4 is a diagram showing a state where the connection/disconnection sleeve shown in FIG. 3 is moved by an actuator to a preset first position.

As shown in FIGS. 1 and 4, the drive gear 36 is integrally provided with an annular first hub member 66 in which a plurality of first outer circumferential engagement teeth 66a are formed in an outer circumference and a first coupling portion 36a which couples the first hub member 66 and the drive gear 36 such that power can be transmitted. The input shaft 32 is integrally provided with an annular second hub member 68 in which a plurality of second outer circumferential engagement teeth 68a are formed in an outer circumference and a second coupling portion 32a which couples the second hub member 68 and the input shaft 32 such that power can be transmitted. The storage casing 20 which is the non-rotating member is integrally provided with an annular third hub member 70 in which a plurality of third outer circumferential engagement teeth 70a are formed in an outer circumference and a third coupling portion 20a which couples the third hub member 70 and the storage casing 20. As shown in FIG. 1, the connection/disconnection sleeve 62, the first hub member 66, the second hub member 68 and the third hub member 70 are arranged on the first rotation axis C1, and the first hub member 66, the second hub member 68 and the third hub member 70 are arranged from the side of the drive gear 36 in the direction of the first rotation axis C1 in the order of the first hub member 66, the second hub member 68 and the third hub member 70. The first outer circumferential engagement teeth 66a, the second outer circumferential engagement teeth 68a and the third outer circumferential engagement teeth 70a have the same outside diameter. As shown in FIG. 4, in the first coupling portion 36a of the drive gear 36, a cylindrical bearing portion 36b is formed which is received by the input shaft 32 and in which the input shaft 32 supports the drive gear 36 such that the drive gear 36 rotates relative to the input shaft 32. In the present embodiment, a metal bearing is provided between the bearing portion 36b of the drive gear 36 and the input shaft 32, for example, the bearing portion 36b of the drive gear 36 is brought into sliding contact with the input shaft 32 through the metal bearing and the metal bearing functions as, for example, a sliding portion for the drive gear 36 and the input shaft 32. A needle bearing may be provided between the bearing portion 36b of the drive gear 36 and the input shaft 32, instead of the metal bearing, for example. The bearing portion 36b of the drive gear 36 itself may support the input shaft 32 while the bearing portion 36b permits a differential rotation between the drive gear 36 and the input shaft 32.

Figure 3:
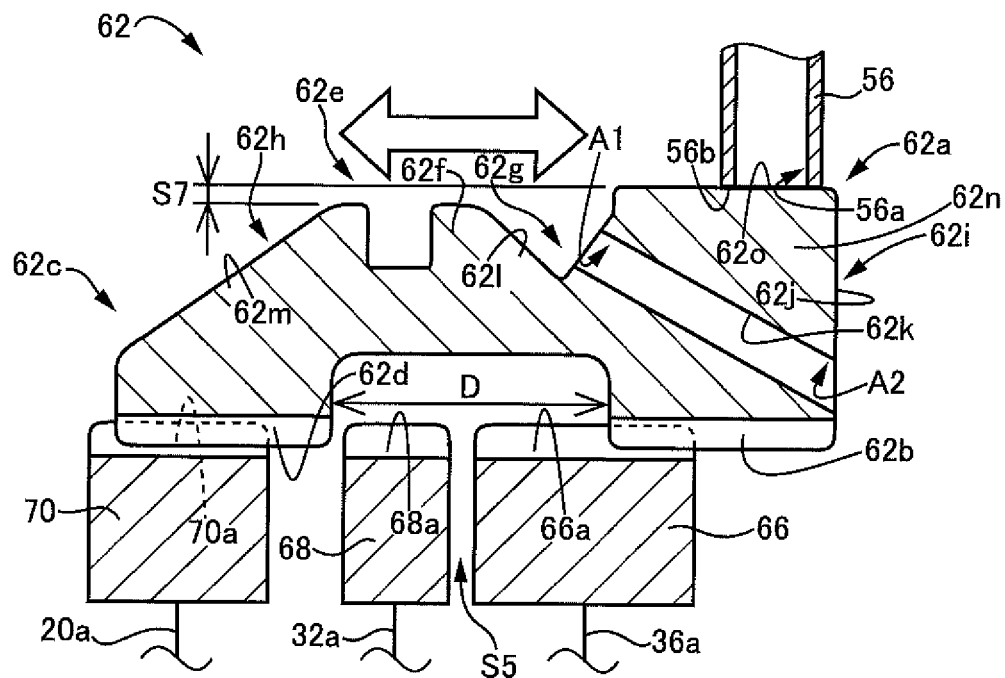
FIG. 3 is a cross-sectional view illustrating the configuration of a connection/disconnection sleeve provided in the front wheel drive apparatus of FIG. 1.

As shown in FIGS. 3 to 6, the connection/disconnection sleeve 62 includes: a plurality of first inner circumferential teeth 62b which are formed in an inner circumference of an end portion 62a of the connection/disconnection sleeve 62 on the side of the drive gear 36 in the direction of the first rotation axis C1; and a plurality of second inner circumferential teeth 62d which are formed in the inner circumference of an end portion 62c of the connection/disconnection sleeve 62 on the side opposite to the side of the drive gear 36 in the direction of the first rotation axis C1. As shown in FIG. 3, the first inner circumferential teeth 62b and the second inner circumferential teeth 62d each formed in the connection/disconnection sleeve 62 are separated away from each other by a predetermined distance D in the direction of the first rotation axis C1. The first inner circumferential teeth 62b formed in the connection/disconnection sleeve 62 are formed such that the first inner circumferential teeth 62b engage with the first outer circumferential engagement teeth 66a formed in the first hub member 66, and the second inner circumferential teeth 62d formed in the connection/disconnection sleeve 62 are formed such that the second inner circumferential teeth 62d engage with at least one of the first outer circumferential engagement teeth 66a formed in the first hub member 66, the second outer circumferential engagement teeth 68a formed in the second hub member 68 and the third outer circumferential engagement teeth 70a formed in the third hub member 70. In other words, the connection/disconnection sleeve 62 can engage with at least one of the first outer circumferential engagement teeth 66a, the second outer circumferential engagement teeth 68a and the third outer circumferential engagement teeth 70a.

As shown in FIG. 1, the actuator 64 includes: a shift fork 72 which is coupled to a fork coupling portion 62f formed in an intermediate portion 62e (see FIG. 3) of the connection/disconnection sleeve 62 in the direction of the first rotation axis C1; a fork shaft 74 to which the shift fork 72 is coupled; and a movement device 76 which moves the fork shaft 74 in a direction parallel to the first rotation axis C1, that is, in a direction of an axis center of the fork shaft 74. As shown in FIG. 1, the movement device 76 includes, for example, an electric motor 78 and a screw mechanism 80 which converts the rotation movement of the electric motor 78 into a linear movement, and in the movement device 76, the fork shaft 74, that is, the shift fork 72 can be moved to a predetermined position in the direction of the axis center of the fork shaft 74 according to an amount of rotation of the electric motor 78. In the actuator 64 configured as described above, the mount of rotation of the electric motor 78 provided in the movement device 76 is controlled by an electronic control device ECU, and thus the connection/disconnection sleeve 62 can be selectively moved to a preset position, for example, a first position, a second position or a third position in the direction of the first rotation axis C1.

As shown in FIG. 4, the first position is a position in which the second inner circumferential teeth 62d of the connection/disconnection sleeve 62 engage both with the first outer circumferential engagement teeth 66a formed in the first hub member 66 and with the second outer circumferential engagement teeth 68a formed in the second hub member 68, and when the connection/disconnection sleeve 62 is moved by the actuator 64 to the first position, the drive gear 36 and the input shaft 32 are connected and the drive gear 36 and the storage casing 20 which is the non-rotating member are disconnected and thus the drive power from the electric motor 12 is transmitted through the input shaft 32 and the counter shaft 34, that is, the power transmission mechanism 18 to the pair of left and right front wheels 14L and 14R.

Figure 5:
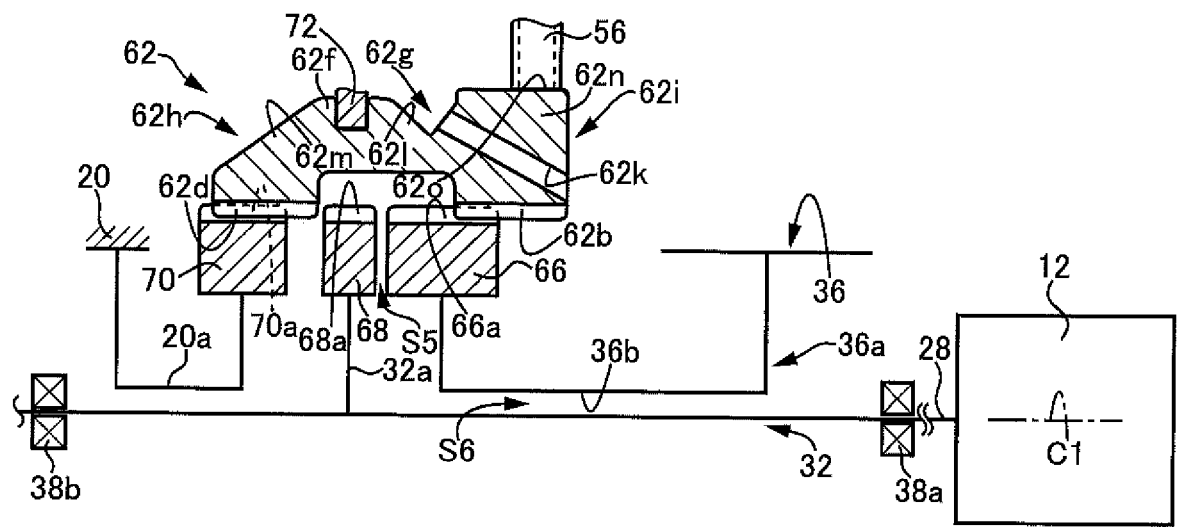
FIG. 5 is a diagram showing a state where the connection/disconnection sleeve shown in FIG. 3 is moved by an actuator to a preset second position.

As shown in FIG. 5, the second position is a position in which the first inner circumferential teeth 62b of the connection/disconnection sleeve 62 engage with the first outer circumferential engagement teeth 66a formed in the first hub member 66 and in which the second inner circumferential teeth 62d of the connection/disconnection sleeve 62 engage with the third outer circumferential engagement teeth 70a formed in the third hub member 70, and when the connection/disconnection sleeve 62 is moved by the actuator 64 to the second position, the drive gear 36 and the input shaft 32 are disconnected and the drive gear 36 and the storage casing 20 which is the non-rotating member are connected and thus the pair of left and right front wheels 14L and 14R are mechanically locked. In the switching mechanism 60, when the connection/disconnection sleeve 62 is moved by the actuator 64 to the first position or the third position, the drive gear 36 and the storage casing 20 are disconnected and thus the pair of left and right front wheels 14L and 14R are unlocked.

Figure 6:
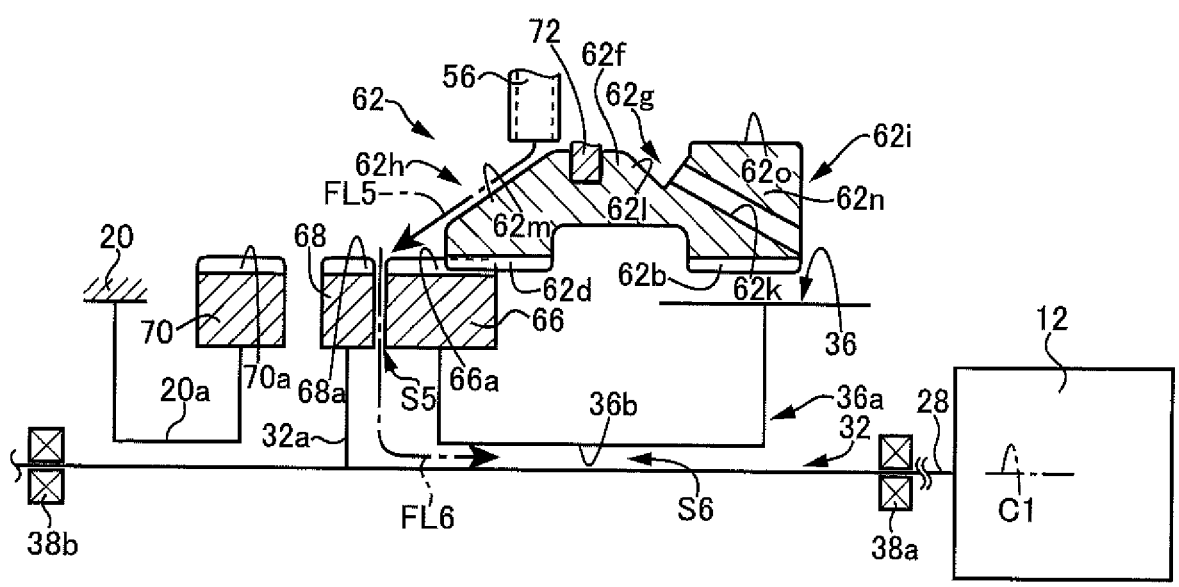
FIG. 6 is a diagram showing a state where the connection/disconnection sleeve shown in FIG. 3 is moved by an actuator to a preset third position.

As shown in FIG. 6, the third position is a position in which the second inner circumferential teeth 62d of the connection/disconnection sleeve 62 engage with only the first outer circumferential engagement teeth 66a formed in the first hub member 66, and when the connection/disconnection sleeve 62 is moved by the actuator 64 to the third position, the drive gear 36 is disconnected from the input shaft 32 and disconnected from the storage casing 20, and the drive gear 36 is relatively rotated with respect to the input shaft 32 and thus the drive power is prevented from being transmitted between the electric motor 12 and the pair of left and right front wheels 14L and 14R.

As shown in FIGS. 3 to 6, the connection/disconnection sleeve 62 includes: a first guide portion 62g which guides the oil OIL discharged from the discharge port 56a of the lubricating pipe 56 to a tooth surface of the drive gear 36 when the connection/disconnection sleeve 62 is in the first position; a second guide portion 62h which guides the oil OIL discharged from the discharge port 56a of the lubricating pipe 56 to the bearing portion 36b in the drive gear 36 when the connection/disconnection sleeve 62 is in the third position; and a closure portion 62i which closes the discharge port 56a of the lubricating pipe 56 when the connection/disconnection sleeve 62 is in the second position. The lubricating pipe 56 is arranged within the storage casing 20 higher than the connection/disconnection sleeve 62 in the vertical direction, that is, the discharge port 56a of the lubricating pipe 56 is arranged within the storage casing 20 higher than the connection/disconnection sleeve 62 in the vertical direction.

As shown in FIGS. 3 and 4, the first guide portion 62g of the connection/disconnection sleeve 62 includes: a plurality of lubricating oil paths 62k which makes a first opening A1 (see FIG. 3) formed in a part of the intermediate portion 62e of the connection/disconnection sleeve 62 communicate with a second opening A2 (see FIG. 3) formed in a part of a side surface 62j of the connection/disconnection sleeve 62 on the side of the drive gear 36 in the direction of the first rotation axis C1; and a tapered guide portion 62l which guides the oil OIL discharged from the discharge port 56a of the lubricating pipe 56 to the first opening A1 of the lubricating oil paths 62k when the connection/disconnection sleeve 62 is in the first position as shown in FIG. 4. In the first guide portion 62g of the connection/disconnection sleeve 62 configured as described above, when the connection/disconnection sleeve 62 is in the first position as shown in FIG. 4, the oil OIL discharged from the discharge port 56a of the lubricating pipe 56 is passed through the lubricating oil paths 62k formed in the connection/disconnection sleeve 62 and is guided to the tooth surface of the drive gear 36. An arrow FL4 shown in FIG. 4 indicates the flow of the oil OIL discharged from the lubricating pipe 56 when the connection/disconnection sleeve 62 is in the first position.

As shown in FIGS. 3 and 5, the closure portion 62i of the connection/disconnection sleeve 62 includes an annular portion 62n which is formed into an annular shape at the end portion 62a (see FIG. 3) of the connection/disconnection sleeve 62 on the side of the drive gear 36 in the direction of the first rotation axis C1. In the annular portion 62n formed in the connection/disconnection sleeve 62, the position of the lubricating pipe 56 and the size of the annular portion 62n in a radial direction are set such that a gap is prevented from being formed between a tip end 56b of the lubricating pipe 56 and an outer circumferential surface 62o of the annular portion 62n when the connection/disconnection sleeve 62 is in the second position as shown in FIGS. 3 and 5. In the connection/disconnection sleeve 62, the position of the lubricating pipe 56 and the size of the connection/disconnection sleeve 62 in the radial direction are set such that a gap S7 (see FIG. 3) is formed between the tip end 56b of the lubricating pipe 56 and the outer circumference of the connection/disconnection sleeve 62 when the connection/disconnection sleeve 62 is not in the second position, for example, when the connection/disconnection sleeve 62 is in the first position or in the third position. In the closure portion 62i of the connection/disconnection sleeve 62 configured as described above, when the connection/disconnection sleeve 62 is in the second position as shown in FIGS. 3 and 5, the discharge port 56a of the lubricating pipe 56 is blocked by a part of the outer circumferential surface 62o of the annular portion 62n formed in the connection/disconnection sleeve 62, and the release of the oil OIL stored in the catch tank 54 from the release hole 54f is suppressed.

As shown in FIGS. 3 to 6, the second guide portion 62h of the connection/disconnection sleeve 62 includes a tapered portion 62m which is formed in a tapered shape at the end portion 62c (see FIG. 3) of the connection/disconnection sleeve 62 on the side opposite to the side of the drive gear 36 in the direction of the first rotation axis C1. In the second guide portion 62h of the connection/disconnection sleeve 62 configured as described above, when the connection/disconnection sleeve 62 is in the third position as shown in FIG. 6, the oil OIL discharged from the discharge port 56a of the lubricating pipe 56 is guided into a gap S5 between the first hub member 66 and the second hub member 68 by the tapered portion 62m formed in the connection/disconnection sleeve 62, and the oil OIL guided into the gap S5 is led to the bearing portion 36b of the drive gear 36, that is, a gap S6 between the bearing portion 36b of the drive gear 36 and the input shaft 32. Arrows FL5 and FL6 shown in FIG. 6 indicate the flow of the oil OIL discharged from the lubricating pipe 56 when the connection/disconnection sleeve 62 is in the third position.

As shown in FIG. 6, when the connection/disconnection sleeve 62 is moved by the actuator 64 in the direction of the first rotation axis C1 from the third position in which the second inner circumferential teeth 62d of the connection/disconnection sleeve 62 engage with only the first outer circumferential engagement teeth 66a of the first hub member 66 to the side on which the connection/disconnection sleeve 62 is moved close to the third hub member 70, the position of the connection/disconnection sleeve 62 is switched from the third position to the first position shown in FIG. 4 and then to the second position shown in FIG. 5 in this order. In other words, the first position is set between the second position and the third position in the direction of the first rotation axis C1.

For example, when a normal running mode of the electric vehicle 10 in which a driver depresses an unillustrated accelerator pedal so as to transmit the drive power from the electric motor 12 through the power transmission mechanism 18 to the pair of left and right front wheels 14L and 14R and to run is selected by the electronic control device ECU, the actuator 64 is controlled by the electronic control device ECU such that the connection/disconnection sleeve 62 is moved to the first position. For example, when a parking lock mode of the electric vehicle 10 in which an unillustrated shift lever is switched to a parking position at the time of stop of the vehicle 10 so as to mechanically lock the front wheels 14L and 14R is selected by the electronic control device ECU, the actuator 64 is controlled by the electronic control device ECU such that the connection/disconnection sleeve 62 is moved to the second position. For example, when a free-run mode of the electric vehicle 10 in which the accelerator is turned off at a predetermined vehicle speed or higher so as to disconnect the electric motor 12 from the front wheels 14L and 14R, to stop the rotation of the electric motor 12 and to perform coasting is selected by the electronic control device ECU, the actuator 64 is controlled by the electronic control device ECU such that the connection/disconnection sleeve 62 is moved to the third position. When the free-run mode is switched to the normal running mode, that is, when the connection/disconnection sleeve 62 is moved by the actuator 64 from the third position to the first position, for example, a rotation speed of the second hub member 68 which is coupled to the input shaft 32 is increased by the electric motor 12 to a rotation speed of the first hub member 66 coupled to the drive gear 36, and then the connection/disconnection sleeve 62 is moved from the third position to the first position.

In the front wheel drive apparatus 16 configured as described above, for example, when the normal running mode is selected by the electronic control device ECU, the connection/disconnection sleeve 62 is moved by the actuator 64 to the first position, and thus as shown in FIG. 4, the oil OIL discharged from the discharge port 56a of the lubricating pipe 56 is guided to the tooth surface of the drive gear 36 by the first guide portion 62g included in the connection/disconnection sleeve 62. For example, when the parking lock mode is selected by the electronic control device ECU, the connection/disconnection sleeve 62 is moved by the actuator 64 to the second position, and thus as shown in FIG. 5, the discharge port 56a of the lubricating pipe 56 is blocked by the closure portion 62i included in the connection/disconnection sleeve 62, and the oil OIL which is necessary at the time of restart of the vehicle 10 is secured in the catch tank 54. For example, when the free-run mode is selected by the electronic control device ECU, the connection/disconnection sleeve 62 is moved by the actuator 64 to the third position, and thus as shown in FIG. 6, the oil OIL discharged from the discharge port 56a of the lubricating pipe 56 is guided to the bearing portion 36b of the drive gear 36 by the second guide portion 62h included in the connection/disconnection sleeve 62.

As described above, in the front wheel drive apparatus 16 of the present embodiment, the drive gear 36 which engages with the large diameter gear 34b provided on the counter shaft 34 is provided on the input shaft 32 such that the drive gear 36 relatively rotates with respect to the input shaft 32, and the switching mechanism 60 is provided that includes the actuator 64 and the connection/disconnection sleeve 62 which is driven by the actuator 64 in the direction of the first rotation axis C1 and which selectively switches between a first state in which the drive gear 36 is connected to the input shaft 32 and disconnected from the storage casing 20 which is the non-rotating member and a second state in which the drive gear 36 is disconnected from the input shaft 32 and connected to the storage casing 20. Hence, the switching mechanism 60 selectively connects the drive gear 36 to one of the storage casing 20 and the input shaft 32 with the actuator 64 which drives the connection/disconnection sleeve 62 in the direction of the first rotation axis C1 and the connection/disconnection sleeve 62 which is driven by the actuator 64 in the direction of the first rotation axis C1 so as to selectively disconnect or connect the drive gear 36 and the input shaft 32. In this way, when the vehicle 10 is not driving, that is, when the drive gear 36 and the input shaft 32 are disconnected, the actuator 64 and the connection/disconnection sleeve 62 connect the drive gear 36 to the storage casing 20 so as to lock the pair of left and right front wheels 14L and 14R. Hence, for example, as compared with a front wheel drive apparatus which includes a device for selectively disconnecting or connecting the drive gear 36 and the input shaft 32 and a device for selectively disconnecting or connecting the drive gear 36 and the storage casing 20 individually, the number of components of the front wheel drive apparatus 16 can be suitably reduced.

According to the front wheel drive apparatus 16 of the present embodiment, the connection/disconnection sleeve 62 is driven by the actuator 64 to any one position of the first position, the second position and the third position, when the connection/disconnection sleeve 62 is in the first position, the drive gear 36 and the input shaft 32 are connected, and the drive gear 36 and the storage casing 20 which is the non-rotating member are disconnected, when the connection/disconnection sleeve 62 is in the second position, the drive gear 36 and the input shaft 32 are disconnected, and the drive gear 36 and the storage casing 20 are connected and when the connection/disconnection sleeve 62 is in the third position, the drive gear 36 and the input shaft 32 are disconnected, and the drive gear 36 and the storage casing 20 are disconnected. Hence, when the normal running mode is performed where the drive power from the electric motor 12 is transmitted to the pair of left and right front wheels 14L and 14R for running of the vehicle 10, the connection/disconnection sleeve 62 is moved by the actuator 64 to the first position, when the pair of left and right front wheels 14L and 14R are mechanically parking-locked at the time of parking of the vehicle 10, the connection/disconnection sleeve 62 is moved by the actuator 64 to the second position and when the free-run mode is performed where the electric motor 12 is disconnected from the pair of left and right front wheels 14L and 14R so as to perform coasting, the connection/disconnection sleeve 62 is moved by the actuator 64 to the third position.

According to the front wheel drive apparatus 16 of the present embodiment, the first position is set between the second position and the third position in the direction of the first rotation axis C1. Hence, for example, a switching time in which the normal running mode and the free-run mode are switched and a switching time in which the normal running mode and the parking lock mode are switched are suitably reduced.

According to the front wheel drive apparatus 16 of the present embodiment, the first rotation axis C1 is arranged coaxially with the rotor shaft 28 provided in the electric motor 12. Hence, as compared with a front wheel drive apparatus in which the first rotation axis C1 is not arranged coaxially with the rotor shaft 28 provided in the electric motor 12 and in which, for example, the input shaft 32 is coupled to the electric motor 12 through a gear mechanism so as to transmit the drive power from the electric motor 12, it is possible to suitably reduce an agitation loss of the oil caused by a gear in the front wheel drive apparatus 16.

According to the front wheel drive apparatus 16 of the present embodiment, the drive gear 36 is integrally provided with the first hub member 66 including the first outer circumferential engagement teeth 66a, the input shaft 32 is integrally provided with the second hub member 68 including the second outer circumferential engagement teeth 68a, the storage casing 20 which is the non-rotating member is integrally provided with the third hub member 70 including the third outer circumferential engagement teeth 70a, the connection/disconnection sleeve 62 engages with at least one of the first outer circumferential engagement teeth 66a, the second outer circumferential engagement teeth 68a and the third outer circumferential engagement teeth 70a and the connection/disconnection sleeve 62, the first hub member 66, the second hub member 68 and the third hub member 70 are arranged on the first rotation axis C1. Hence, even when the first hub member 66, the second hub member 68 and the third hub member 70 are provided in the front wheel drive apparatus 16, an increase in the size of the front wheel drive apparatus 16 in a radial direction of the first rotation axis C1 is suitably suppressed.

According to the front wheel drive apparatus 16 of the present embodiment, the connection/disconnection sleeve 62 includes the first inner circumferential teeth 62b and the second inner circumferential teeth 62d which are separated away from each other by a predetermined distance D in the direction of the first rotation axis C1, the first position is a position in which the second inner circumferential teeth 62d engage both with the first outer circumferential engagement teeth 66a of the first hub member 66 and with the second outer circumferential engagement teeth 68a of the second hub member 68, the second position is a position in which the first inner circumferential teeth 62b engage with the first outer circumferential engagement teeth 66a of the first hub member 66 and in which the second inner circumferential teeth 62d included in the connection/disconnection sleeve 62 engage with the third outer circumferential engagement teeth 70a of the third hub member 70 and the third position is a position in which the second inner circumferential teeth 62d engage with only the first outer circumferential engagement teeth 66a of the first hub member 66. Hence, when the connection/disconnection sleeve 62 is moved by the actuator 64 to the first position, the drive gear 36 and the input shaft 32 are connected, and the drive gear 36 and the storage casing 20 which is the non-rotating member are disconnected, when the connection/disconnection sleeve 62 is moved by the actuator 64 to the second position, the drive gear 36 and the input shaft 32 are disconnected, and the drive gear 36 and the storage casing 20 are connected and when the connection/disconnection sleeve 62 is moved by the actuator 64 to the third position, the drive gear 36 and the input shaft 32 are disconnected, and the drive gear 36 and the storage casing 20 are disconnected.

According to the front wheel drive apparatus 16 of the present embodiment, after the rotation speed of the second hub member 68 is increased through the input shaft 32 by the electric motor 12 to the rotation speed of the first hub member 66, the connection/disconnection sleeve 62 is moved by the actuator 64 from the third position to the first position. Hence, it is not necessary to provide, in the switching mechanism 60, a synchronization device for synchronizing the rotation speed of the second hub member 68 with the rotation speed of the first hub member 66 when the connection/disconnection sleeve 62 is moved from the third position to the first position, and the connection/disconnection sleeve 62 can be moved by the actuator 64 from the third position to the first position.

Although the embodiment of the present invention is described in detail above with reference to the drawings, the present invention is also applied to other aspects.

For example, although in the front wheel drive apparatus 16 of the embodiment described above, the pair of left and right front wheels 14L and 14R are driven by the drive power of the electric motor 12, the front wheel drive apparatus 16 may be used as, for example, a rear wheel drive apparatus for driving a pair of left and right rear wheels. Although in the embodiment described above, the front wheel drive apparatus 16 is applied to the electric vehicle 10 which runs only by the drive power of the electric motor 12, the front wheel drive apparatus 16 may be applied to, for example, a four-wheel drive hybrid vehicle in which a pair of left and right rear wheels are driven by the drive power of an engine and in which the pair of left and right front wheels 14L and 14R are driven by the drive force of the electric motor 12.

Although in the embodiment described above, the actuator 64 selectively moves the connection/disconnection sleeve 62 to any one position of the first position, the second position and the third position, for example, the actuator 64 may only selectively move the connection/disconnection sleeve 62 to the first position or the second position without moving the connection/disconnection sleeve 62 to the third position. In other words, the switching mechanism 60 does not necessarily have the function of disconnecting the drive gear 36 from the input shaft 32 and disconnecting the drive gear 36 from the storage casing 20, that is, the function of disconnecting the drive gear 36 and the input shaft 32 and disconnecting the drive gear 36 and the storage casing 20.

The embodiment described above is merely an embodiment, and the present invention can be practiced with aspects in which various variations and modifications are added based on the knowledge of a person skilled in the art.

REFERENCE SIGNS LIST

12: electric motor (rotating electrical machine)
14L, 14R: front wheels (wheels)
16: front wheel drive apparatus (vehicle drive apparatus)
20: storage casing (non-rotating member)
28: rotor shaft (output shaft)
32: input shaft
34: counter shaft
34b: large diameter gear (gear)
36: drive gear
60: switching mechanism
62: connection/disconnection sleeve
62b: first inner circumferential teeth
62d: second inner circumferential teeth
64: actuator
66: first hub member
66a: first outer circumferential engagement teeth
68: second hub member
68a: second outer circumferential engagement teeth
70: third hub member
70a: third outer circumferential engagement teeth
C1: first rotation axis
C2: second rotation axis
D: predetermined distance

The invention claimed is:

1. A vehicle drive apparatus
including a rotating electrical machine which serves as a drive power source for a plurality of wheels, an input shaft which is coupled to the rotating electrical machine in a power transmittable manner and rotatably about a first rotation axis, and a counter shaft which is provided rotatably about a second rotation axis parallel to the first rotation axis and
the vehicle drive apparatus transmitting drive power from the rotating electrical machine through the input shaft and the counter shaft to the wheels so as to drive the wheels,
wherein a drive gear which engages with a gear provided on the counter shaft is provided on the input shaft relatively rotatably to the input shaft, and
the vehicle drive apparatus comprises a switching mechanism including an actuator and a connection/disconnection sleeve which is driven by the actuator in a direction of the first rotation axis and which selectively switches between a first state in which the drive gear is connected to the input shaft and disconnected from a non-rotating member and a second state in which the drive gear is disconnected from the input shaft and connected to the non-rotating member.

2. The vehicle drive apparatus according to claim 1,
wherein the connection/disconnection sleeve is driven by the actuator to one position of a first position, a second position and a third position selectively,
when the connection/disconnection sleeve is in the first position, the drive gear is connected to the input shaft and disconnected from the non-rotating member,
when the connection/disconnection sleeve is in the second position, the drive gear is disconnected from the input shaft and connected to the non-rotating member and
when the connection/disconnection sleeve is in the third position, the drive gear is disconnected from the input shaft and disconnected from the non-rotating member.

3. The vehicle drive apparatus according to claim 2,
wherein the first position is set between the second position and the third position in the direction of the first rotation axis.

4. The vehicle drive apparatus according to claim 1,
wherein the first rotation axis is arranged coaxially with an output shaft of the rotating electrical machine.

5. The vehicle drive apparatus according to claim 1,
wherein the drive gear is integrally provided with a first hub member including a first outer circumferential engagement tooth,
the input shaft is integrally provided with a second hub member including a second outer circumferential engagement tooth,
the non-rotating member is integrally provided with a third hub member including a third outer circumferential engagement tooth,
the connection/disconnection sleeve engages with at least one of the first outer circumferential engagement tooth, the second outer circumferential engagement tooth and the third outer circumferential engagement tooth and
the connection/disconnection sleeve, the first hub member, the second hub member and the third hub member are arranged on the first rotation axis.

6. The vehicle drive apparatus according to claim 5,
wherein the connection/disconnection sleeve includes a first inner circumferential tooth and a second inner circumferential tooth which are separated a predetermined distance apart from each other in the direction of the first rotation axis, the first position is a position in which the second inner circumferential tooth engages both with the first outer circumferential engagement tooth of the first hub member and with the second outer circumferential engagement tooth of the second hub member, the second position is a position in which the first inner circumferential tooth engages with the first outer circumferential engagement tooth of the first hub member and in which the second inner circumferential tooth included in the connection/disconnection sleeve engages with the third outer circumferential engagement tooth of the third hub member and the third position is a position in which the second inner circumferential tooth engages with the first outer circumferential engagement tooth of the first hub member.

7. The vehicle drive apparatus according to claim 6,
wherein the connection/disconnection sleeve is moved by the actuator from the third position to the first position, after a rotation speed of the second hub member is increased to a rotation speed of the first hub member by the rotating electrical machine through the input shaft.

* * * * *